UNITED STATES PATENT OFFICE 2,488,736

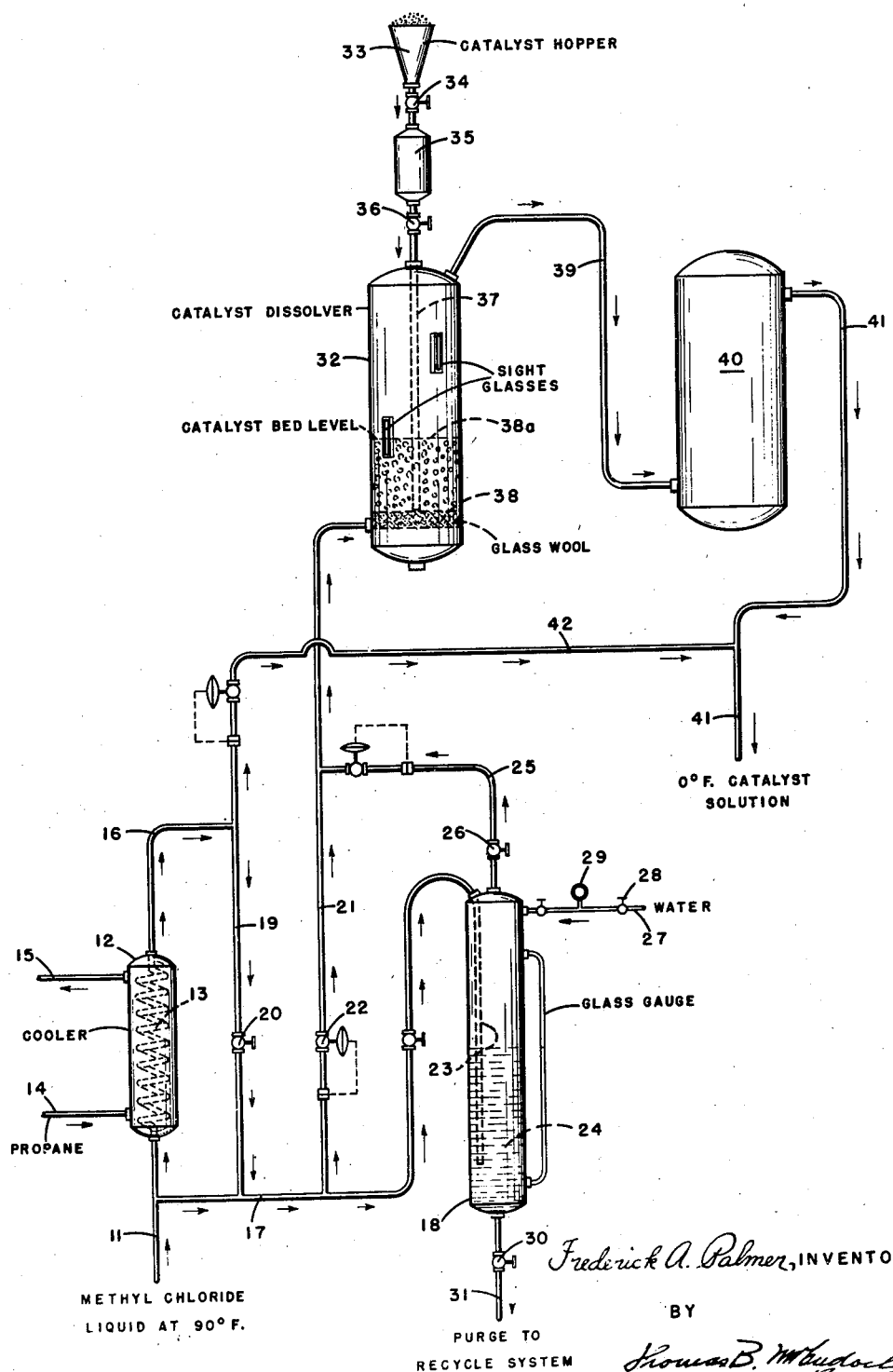

POLYMERIZATION OF OLEFINS WITH FRIEDEL-CRAFTS CATALYSTS DISSOLVED IN WATER CONTAINING ALKYL HALIDE SOLVENTS

Frederick A. Palmer, Wooster, Tex., assignor, by mesne assignments, to Standard Oil Development Company, Elizabeth, N. J., a corporation of Delaware Application August 28, 1948, Serial No. 46,618

13 Claims. (Cl. 260—85.3)

The present invention is directed to a method for preparing an improved catalyst which is suitable for the polymerization of olefins at a subatmospheric temperature. More particularly, the invention is directed to the low temperature polymerization of olefinic mixtures in the presence of a Friedel-Crafts catalyst of enhanced activity. In its more specific aspects the invention is directed to the preparation of an improved catalytic solution of a Friedel-Crafts catalyst.

It has been known prior to the present invention to polymerize olefins such as mono-olefins at a low temperature of the order of −50° to −175° F. to form high molecular weight polymers. It has also been known to polymerize mixtures of mono-olefins and diolefins at temperatures of the order of −50° F. to −175° F. in the presence of Friedel-Crafts catalyst. The aforementioned types of polymerization reactions are very sensitive to impurities in the hydrocarbon reactants. The reaction is also quite sensitive to impurities in the solvent, such as the alkyl halide which is customarily employed to form a catalytic solution of the Friedel-Crafts catalyst. It has also been customary to employ a diluent for the hydrocarbon reactants and it has been found that diluents such as alkyl halides are quite useful in the low temperature polymerization reactions of the aforesaid type. The impurities found in the alkyl halide and in the hydrocarbon have included polymers, acidic sulfur compounds, oxygenated organic compounds, nitrogen compounds, and many others too numerous to mention here.

To overcome the difficulties due to impurities in the feed stocks and in the diluent it has been necessary to resort to expensive purification procedures to provide feed stocks and diluents for the reaction in a substantially pure form. However, when substantially pure feed stocks and substantially pure diluents were provided for solid Friedel-Crafts catalyst the catalyst solution was observed to have a low activity. It is well known that substantially pure Friedel-Crafts catalysts such as aluminum chloride are not catalytically active unless an electron donor capable of generating an active carbonium ion is present. The degree of activity of such a catalyst produced by providing an electron donor as activator is extremely sensitive to the concentration of the activator relative to the Friedel-Crafts catalyst as well as to the concentration of the Friedel-Crafts catalyst in the catalytic solution.

In the aforementioned low temperature polymerization process in which a mono-olefin is reacted with a diolefin, the catalyst solution is usually aluminum chloride dissolved in methyl chloride. The uniformity of this catalyst solution with respect to the concentration of aluminum chloride and activity thereof determines in a large degree the success in obtaining a smooth polymerization reaction. It is possible to control the concentration of aluminum chloride in methyl chloride solution by determining the quantity of the aluminum chloride in a given solution and adjusting the concentration by adding more methyl chloride to the concentrated solution of aluminum chloride in methyl chloride. However, aluminum chloride, as commercially available, usually contains as impurities thereof activational materials which make it difficult to control the activity level in the final solution. Numerous methods have been tried to minimize the activity of the compounds associated with aluminum chloride and some success has attended these methods. However, the methods employed in the prior art in overcoming the activity of compounds associated with aluminum chloride has resulted in providing a very sensitive polymerization reaction which varies widely by slight changes in the reaction conditions.

It is, therefore, the main object of the present invention to provide an improved polymerization process in which a mono-olefin and a diolefin are reacted at a low temperature in the presence of a Friedel-Crafts catalyst in solution in an alkyl halide.

Another object of the present invention is to provide a method for preparing an improved catalyst solution including a Friedel-Crafts catalyst in an alkyl halide.

Another object of the invention is to provide a catalytic solution of enhanced activity by a series of operational steps in which a Friedel-Crafts catalyst is dissolved in the alkyl halide solvent.

The objects of the present invention may be achieved by preparing a catalytic solution suitable for the aforementioned polymerization process by dissolving a solid Friedel-Crafts catalyst in an alkyl halide which has been saturated or at least partially saturated with water and then adjusting the concentration of aluminum chloride in the catalyst solution by adding to the aluminum chloride solution alkyl halide which does not contain water. Such catalytic solutions are very useful in the aforementioned polymerization operations.

The invention may be described briefly as involving the formation of a first stream of an alkyl halide such as methyl chloride at a substantially atmospheric temperature of the order of about 60° to 120° F. This first stream is then divided into second and third streams. The second stream is at least partly saturated with water by flowing it upwardly through a pool of water. The water-saturated stream is then employed to dissolve a solid Friedel-Crafts catalyst such as aluminum chloride to form a first solution of Friedel-Crafts catalyst. To the first solution is then added the third stream, which is chilled to a temperature of the order of about −10° F., to adjust the concentration of aluminum chloride in a second solution which is formed thereby. This second solution then contains aluminum chloride of known concentration and also contains compounds which are formed by the reaction of the dissolved water in the alkyl halide solvent. These compounds include hydrogen chloride and other hydrolysis reaction products of aluminum chloride such as $AlCl_2OH$. Both of these compounds have been found to be highly activational materials for aluminum chloride.

The temperature of the incoming feed methyl chloride may suitably be at atmospheric temperature, for example from about 60° F. to about 100° F., and usually is at about 90° F. but may range upwardly to 120° F. The second stream is either chilled or heated to adjust the temperature of the stream contacting the pool of water to a temperature of about 60° F. to 120° F. The third stream may be at a temperature of about −10° F. but this may vary depending on the temperature to which the second stream is adjusted. In any event, the temperature of the third stream will be sufficiently low to provide a catalyst solution at a temperature of about 0° F. or lower where the first solution is admixed with the third stream of methyl chloride. It will be understood that pressures on the system will be sufficient to maintain the methyl chloride in a liquid condition. Under the temperature conditions mentioned, pressures of the order of 60 to 200 pounds per square inch gauge may be required.

As mentioned before, one of the streams of alkyl halide is substantially saturated with water. Substantial saturation of water provides an amount of water sufficient to cause optimum activation of the polymerization reaction of the aforementioned type when the stream containing water is diluted with water-free methyl chloride. Although optimum results are obtained with a portion of the stream which has been saturated with water, it will be understood that water concentrations below saturation may be desirable under some conditions. Stating this otherwise, it may be desirable to dissolve an amount of water to contact the catalyst to provide, on the basis of the aluminum chloride available, an amount of water in the range from about 0.01 to about 4 mols per mol of aluminum chloride. In effect, a stream of methyl chloride may be saturated or at least partially saturated with water to form a solution of methyl chloride containing water and then to this methyl chloride may be added additional methyl chloride which is substantially free of water. This results in the adjustment of the concentration of the water in the methyl chloride to provide an amount of water in the range given in the final catalytic solution when aluminum chloride is dissolved therein.

Although water is the preferred saturation medium for the alkyl halide such as methyl chloride, it may be desirable under some conditions to use aqueous solutions such as aqueous alcoholic solutions. Such solutions will also provide activation for the aluminum halide.

The mono-olefins employed in the aforementioned polymerization reaction should preferably be tertiary mono-olefins such as isobutylene, the tertiary pentylenes, hexylenes, heptylenes and octylenes. The diolefin will preferably be isoprene or butadiene 1,3 although other diolefins such as pentadiene 1-3 and the conjugated hexadienes, heptadienes and octadienes may be used. Methyl chloride is the preferred alkyl halide. However, other alkyl halides such as methyl bromide, ethyl bromide and ethyl chloride may be used in lieu of the methyl chloride.

The invention will now be further illustrated by reference to the drawing in which the sole figure represents a preferred mode of practicing my invention.

Referring now to the drawing, numeral 11 designates an inlet line through which methyl chloride is introduced into the system from a source not shown. The methyl chloride is divided into two streams, one of which flows by way of line 11 through a refrigerating means 12 which is provided with a coil 13 around which chilled propane is circulated through inlet line 14 and outlet line 15. The circulation of chilled propane at a subatmospheric temperature provides refrigeration for the methyl chloride to a low temperature of the order of −10° F. This chilled methyl chloride issues from refrigerating means by line 16 for further use as will be described hereinafter. The second stream of methyl chloride flows by way of line 17 into a water-saturation drum 18 in admixture with a portion of the chilled methyl chloride from line 16 which is admixed therewith by branch line 19 controlled by valve 20 to adjust the temperature thereof. This admixture of chilled methyl chloride at the aforementioned low temperature provides a mixture in line 17 at about 60° F. to about 80° F., as desired. This mixture is again divided, one portion of it flowing into saturation drum 18 by line 17 while the other portion flows through line 21 controlled by valve 22, as will be described further. The methyl chloride at a temperature of about 60° F. to about 80° F. flows downwardly into saturation drum 18 by dip pipe 23 which is indicated by the dotted line. Water saturation drum 18 is provided with a pool or column of water 24 indicated by the shaded portion. As the methyl chloride at a temperature in the range of about 60° F. to about 80° F. flows upwardly through the pool of water it becomes substantially saturated with water and issues from drum 18 by line 25 controlled by valve 26 which discharges it back into line 21 where an admixture is made with the material flowing therethrough for further use, as will be described. The actual proportions of methyl chloride flowing through line 21, before it is joined by line 25, and through line 25 may vary widely. The amounts will, of course, depend on the amount of water dissolved in the methyl chloride as it flows through drum 18 and outward therefrom into line 25. Also, the amount of methyl chloride in line 25 relative to the amount in line 21 will depend on the degree of activation desired of the catalyst solution. It is necessary to adjust the degree of saturation of the methyl chloride in lines 25 and 21 to provide a final catalyst solution containing an amount of water in the range between 0.05 and 4 moles of water per mole of Friedel-Crafts catalyst.

The solution of water in methyl chloride in the portion of line 21 on the downstream side of line 25 which flows into a catalyst charging drum 32 which is provided with a catalyst hopper 33 controlled by a valve 34 and a catalyst drum 35 controlled by valve 36. Aluminum chloride in a substantially anhydrous condition is placed in catalyst hopper 33, allowed to drop downwardly by manipulation of valve 34 into catalyst vessel 35 and thence by dip leg 37 into the drum 32 where it ultimately rests on a mat or screen of glass wool 38 or other retaining means. Suitably screen 38 may be a metal gridwork or other supporting means. Thus a bed 38a of aluminum chloride is built up on screen 38 and as the water-containing methyl chloride flows upwardly therethrough the aluminum chloride is caused to be dissolved in the methyl chloride to form a first solution of aluminum chloride in methyl chloride. As the solution is formed it flows outwardly from drum 32 by line 39 into a concentrated catalyst solution drum 40. From catalyst concentrate drum 40 the concentrated solution is withdrawn by way of line 41 and then is admixed therein with the stream of chilled methyl chloride introduced thereto from line 42. By adjusting quantities of the methyl chloride introduced by line 42 into line 41 it is possible to adjust the concentration of aluminum chloride in the final catalyst solution having enhanced activity. By adjusting the quantity of methyl chloride flowed through line 21 in admixture with the methyl chloride flowing through water saturation pot 18, it is possible to adjust the concentration of activational materials in the final catalyst solution.

The final catalyst solution in line 41 is then at a temperature of about 0° F. and may be stored for use in polymerization reactions of the type mentioned.

The invention will be more fully illustrated by the following example.

Methyl chloride at a temperature of 90° F. was divided into two streams. One stream was chilled to a temperature of −10° F. by flowing through a suitable heat exchanger in heat exchange with cold propane. The other stream had admixed with it a portion of chilled methyl chloride to reduce its temperature to 60° to 80° F. and this stream was further divided with part of it flowing through a water pot containing 12 gallons of water. The portion of the methyl chloride at 60° to 80° F. was flowed upwardly through the water pot and outward therefrom and then admixed with the other portion of the methyl chloride at a temperature of 60° to 80° F. This admixture containing water was then flowed into a catalyst dissolver drum containing substantially anhydrous aluminum chloride. This drum had a diameter of about 2 ft. and a height of about 5 ft. As the stream of methyl chloride containing water flowed upwardly through the aluminum chloride, a solution of aluminum chloride in methyl chloride was formed which was then discharged into a suitable drum. This stream was withdrawn from the drum and then admixed with the methyl chloride to which no water had been added to a temperature of −10° F. to give a catalyst solution containing aluminum chloride and a promoter. This catalyst solution was maintained in storage at a temperature of 0° F. and then employed after chilling to a temperature in the neighborhood of about −140 to about −150° F. to polymerize a hydrocarbon mixture including isobutylene isoprene. The feed mixture included isobutylene and isoprene and methyl chloride which acts as a diluent for the reaction. The catalyst solution was allowed to contact the feed mixture in a reaction vessel for an interval of time sufficient to cause the formation of a high molecular weight polymer which had the characteristics of rubber. This polymer was produced on a continuous basis and allowed to flow outwardly from the reaction vessel into a suitable vessel where the reaction was terminated by the addition of hot water to form a suspension or a slurry of grains or particles of rubbery polymer in water. The rubbery polymer in suspension in water was then separated from the water and subjected to suitable milling on hot mills to provide a product which is suitable for employment in the manufacture of inner tubes and other products to which synthetic rubber is also useful.

The aforementioned polymerization reaction, in large commercial operations, is conducted in a series of polymerization reactors. The hydrocarbons in the methyl chloride solution are agitated violently in contact with the aluminum chloride solution in methyl chloride to form a slurry or suspension of the polymer in the methyl chloride. Operation of the polymerization reaction on a continuous basis under the conventional methods has resulted in a condition which is known as mass fouling of the reactors. It is believed that, in the reactor, the catalyst under some conditions causes the polymer to agglomerate into large masses which gradually grow to a size sufficient to obstruct tubes and outlet lines through which the product is conducted. By operating with the improved catalyst in accordance with the present invention it is possible to reduce formations of such large masses of polymer.

The present invention has been employed successfully over a long period of time in producing synthetic rubber from isobutylene and isoprene at a rate of about twenty thousand to thirty thousand tons per year.

The nature and objects of the present invention having been thus described and illustrated, what is claimed as new and useful and is desired to be secured by Letters Patent is:

1. A method for activating a solution of a Friedel-Crafts catalyst in an alkyl halide which comprises dividing a first stream of alkyl halide into second and third streams of alkyl halide, saturating said second stream with water, contacting said water saturated stream with a Friedel-Crafts catalyst to form a first solution of Friedel-Crafts catalyst in alkyl halide, and admixing said first solution with said third stream to form a second solution of Friedel-Crafts catalyst which has enhanced activity.

2. A method in accordance with claim 1 in which the Friedel-Crafts catalyst is aluminum chloride and the alkyl halide is methyl chloride.

3. A method in accordance with claim 1 in which the temperature of the second stream is adjusted to a temperature within the range of about 60° F. to 120° F. before it is saturated with water and in which the third stream is chilled to about −10° F. before it is mixed with the first solution.

4. A method for activating a solution of a solid Friedel-Crafts catalyst in an alkyl halide which comprises dividing a first stream of methyl chloride into second and third streams of methyl chloride, adjusting the temperature of said second stream to a temperature of the order of 60° to 120° F., flowing said second stream through a pool of water to saturate said second stream, contacting said water-saturated stream with aluminum chloride to form a first solution of aluminum chloride, chilling said third stream to a temperature of the order of —10° F. and admixing said chilled third stream with said first solution to form a second solution of aluminum chloride which has enhanced activity.

5. A method in accordance with claim 4 in which said aluminum chloride and said methyl chloride are substantially anhydrous.

6. A method for polymerizing a mono-olefin and diolefin under conditions to form a high molecular weight rubbery polymer which comprises dividing a first stream of anhydrous alkyl halide into second and third streams of alkyl halide; saturating said second stream with water, contacting said water-saturated stream with a Friedel-Crafts catalyst to form a first solution of Friedel-Crafts catalyst in alkyl halide, admixing said first solution with said third stream to form a second solution of Friedel-Crafts catalyst, forming a feed stream of mono-olefin and a diolefin at a temperature in the range between —50° and —175° F., contacting said feed stream with said second solution at a temperature in the range between —50° and —175° F. for a time interval sufficient to cause polymerization of said hydrocarbons to a rubbery polymer and recovering said polymer.

7. A method in accordance with claim 6 in which the Friedel-Crafts catalyst is anhydrous aluminum chloride and the alkyl halide is anhydrous methyl chloride.

8. A method in accordance with claim 6 in which the mono-olefin and diolefin are substantially anhydrous isobutylene and isoprene.

9. A method for activating a solution of Friedel-Crafts catalyst in an alkyl halide which comprises forming a first stream of alkyl halide, dividing said first stream into second and third streams, adjusting the temperature of said second stream to a temperature in the range from about 60° F. to about 120° F., and dividing said second stream into fourth and fifth streams, at least partially saturating said fourth stream with water, admixing said at least partially saturated fourth stream with said fifth stream to provide an alkyl halide containing an amount of water in the range from 0.5 to 4 mols per mol of Friedel-Crafts catalyst to be dissolved in said alkyl halide, contacting said combined fourth and fifth streams with Friedel-Crafts catalyst to form a first solution of Friedel-Crafts catalyst in alkyl halide, chilling said third stream to a temperature of the order of —10° F. and admixing said first solution with said chilled third stream to form a second solution of Friedel-Crafts catalyst containing an amount of water in the range between 0.05 to 4 mols per mol of Friedel-Crafts catalyst.

10. A method in accordance with claim 9 in which the Friedel-Crafts catalyst is anhydrous aluminum chloride and the alkyl halide is anhydrous methyl chloride.

11. A method for polymerizing a mono-olefin and a diolefin under conditions to form a high molecular weight polymer which comprises dividing a first stream of anhydrous alkyl halide into second and third streams of alkyl halide, adjusting the temperature of said second stream to a temperature within the range of about 60° F. to about 120° F., dividing said second stream into fourth and fifth streams, at least partially saturating said fourth stream with water, admixing said at least partially saturated fourth stream with said fifth stream to form a sixth stream containing water, contacting said sixth stream with Friedel-Crafts catalyst to form a first solution of Friedel-Crafts catalyst in alkyl halide, chilling said third stream to a temperature of the order of —10° F., admixing said chilled third stream with said first solution to form a second solution of Friedel-Crafts catalyst containing water in the range from about 0.05 mol to about 4 mols per mol of Friedel-Crafts catalyst, forming a feed stream of a mono-olefin and a diolefin at a temperature in the range between —50° and —175° F., contacting said feed stream with said second solution at a temperature in the range between —50° and —175° F. for a time interval sufficient to cause polymerization of said hydrocarbons to a rubbery polymer and recovering said rubbery polymer.

12. A method in accordance with claim 11 in which the Friedel-Crafts catalyst is anhydrous aluminum chloride and the alkyl halide is anhydrous methyl chloride.

13. A method in accordance with claim 11 in which the mono-olefin and diolefin are substantially anhydrous isobutylene and isoprene.

FREDERICK A. PALMER.

No references cited.